(12) United States Patent
Srinivasan et al.

(10) Patent No.: US 10,097,888 B2
(45) Date of Patent: Oct. 9, 2018

(54) DETERMINING AUDIENCE ENGAGEMENT

(71) Applicant: Cisco Technology, Inc., San Jose, CA (US)

(72) Inventors: Rajagopal Srinivasan, Bangalore (IN); Tuli Kundu, Kolkata (IN); Chinna D. Venkatesh, Bangalore (IN); Saurabh Mishra, Lucknow (IN)

(73) Assignee: Cisco Technology, Inc., San Jose, CA (US)

( * ) Notice: Subject to any disclaimer, the term of this patent is extended or adjusted under 35 U.S.C. 154(b) by 59 days.

(21) Appl. No.: 15/424,986

(22) Filed: Feb. 6, 2017

(65) Prior Publication Data

US 2018/0205989 A1 Jul. 19, 2018

(51) Int. Cl.
| | |
|---|---|
| *H04N 21/442* | (2011.01) |
| *H04N 21/25* | (2011.01) |
| *H04N 21/466* | (2011.01) |
| *H04N 21/4223* | (2011.01) |

(52) U.S. Cl.
CPC ..... *H04N 21/44218* (2013.01); *H04N 21/251* (2013.01); *H04N 21/4223* (2013.01); *H04N 21/4667* (2013.01)

(58) Field of Classification Search
CPC ........... H04N 21/44218; H04N 21/251; H04N 21/4223; H04N 21/4667
See application file for complete search history.

(56) References Cited

U.S. PATENT DOCUMENTS

| | | | | |
|---|---|---|---|---|
| 5,016,281 | A * | 5/1991 | Eppler | G06M 1/101 250/222.2 |
| 8,855,375 | B2 * | 10/2014 | Macciola | H04N 1/387 382/112 |
| 2008/0091512 | A1 | 4/2008 | Marci et al. | |
| 2009/0226044 | A1 * | 9/2009 | Ngan | G06K 9/00234 382/115 |

(Continued)

OTHER PUBLICATIONS

Chengyuan Peng et al. "Real-Time Face Tracking for Audience Engagement" Proceedings of the 2nd World Congress on Electrical Engineering and Computer Systems and Science (EECSS'16) Budapest, Hungary—Aug. 16-17, 2016 Paper No. MVML 105 DOI: 10.11159/mvml16.1055.*

(Continued)

*Primary Examiner* — Benjamin R Bruckart
*Assistant Examiner* — Susan X Li
(74) *Attorney, Agent, or Firm* — Merchant & Gould P.C.

(57) ABSTRACT

Determining audience engagement may be provided. First, an image may be received and a plurality of faces may be identified in the received image. Then position data and head pose data for each of the plurality of faces in the received image may be determined. Next, the plurality of faces may be separated into a plurality of clusters based upon the determined position data for each of the plurality of faces in the received image. For each of the plurality of clusters, a plurality of bins may be created where each bin corresponds to a non-overlapping range between a maximum pose data value and a minimum pose data value. Next, a bin count may be determined for each of the plurality of bins in each of the plurality of clusters and then an engagement value may be determined for each of the plurality of clusters based on the bin count.

20 Claims, 9 Drawing Sheets

(56) References Cited

U.S. PATENT DOCUMENTS

| | | | |
|---|---|---|---|
| 2012/0170830 A1* | 7/2012 | Blanton | ................. G06T 7/001 |
| | | | 382/149 |
| 2013/0103624 A1 | 4/2013 | Thieberger | |
| 2013/0205311 A1* | 8/2013 | Ramaswamy | ... H04N 21/44213 |
| | | | 725/9 |
| 2013/0268954 A1 | 10/2013 | Hulten et al. | |
| 2014/0317646 A1* | 10/2014 | Garza | .............. H04N 21/44218 |
| | | | 725/12 |
| 2015/0350730 A1 | 12/2015 | El Kaliouby et al. | |
| 2016/0066034 A1* | 3/2016 | Hicks | .............. H04N 21/44218 |
| | | | 725/12 |
| 2017/0116204 A1* | 4/2017 | Davulcu | ............. G06F 17/3071 |
| 2017/0160813 A1* | 6/2017 | Divakaran | .............. G06F 3/017 |
| 2018/0007431 A1* | 1/2018 | Sidhu | .............. H04N 21/44218 |

OTHER PUBLICATIONS

Chengyuan Peng et al., "Real-Time Face Tracking for Audience Engagement," Proceedings of the 2nd World Congress on Electrical Engineering and Computer Systems and Science (EECSS'16), Budapest, Hungary, Aug. 16-17, 2016, Paper No. MVML 105, DOI: 10.11159/mvml16.105, 4 pgs.

* cited by examiner

DETERMINING AUDIENCE ENGAGEMENT

TECHNICAL FIELD

The present disclosure may relate generally to determining audience engagement.

BACKGROUND

In imaging science, image processing is processing of images using mathematical operations by using any form of signal processing for which the input is an image, a series of images, or a video, such as a photograph or video frame; the output of image processing may be either an image or a set of characteristics or parameters related to the image. Most image-processing techniques involve treating the image as a two-dimensional signal and applying standard signal-processing techniques to it. Images are also processed as three-dimensional signals with the third-dimension being time or the z-axis.

Image processing usually refers to digital image processing, but optical and analog image processing also are possible. The acquisition of images (producing the input image in the first place) is referred to as imaging.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Determining audience engagement may be provided. First, an image may be received and a plurality of faces may be identified in the received image. Then position data and head pose data for each of the plurality of faces in the received image may be determined. Next, the plurality of faces may be separated into a plurality of clusters based upon the determined position data for each of the plurality of faces in the received image. For each of the plurality of clusters, a plurality of bins may be created where each bin corresponds to a non-overlapping range between a maximum pose data value and a minimum pose data value. Next, a bin count may be determined for each of the plurality of bins in each of the plurality of clusters and then an engagement value may be determined for each of the plurality of clusters based on the bin count.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Many organizations today may rely on audience engagement during an event and solicit feedback from the audience by using feedback processes such as surveys, questionnaires, or feedback forms. Because the feedback processes may not be mandatory, many audience participants may choose not to fill out the surveys, questionnaires, or feedback forms due to time limitations or other reasons. Many organizations may sometimes receive as low as a 10% survey feedback participation, which may indicate a need for a more reliable solution. Embodiments of the disclosure may provide a real-time solution that may help a presenter to identify clusters in an audience where an engagement score (i.e., value) is low. Based on the engagement score, the presenter may take actions in real-time to improve upon the overall audience engagement.

Audience engagement may be a key metric to determine how well a presentation is being delivered. Accordingly, presenters may need a real-time view of the audience as well as a summarized view to react to the audience's current mood in real-time rather than waiting for a survey for feedback. Embodiments of the disclosure may be used to rate presenters based on their engagement score or to measure customer engagement levels and generate marketing leads accordingly.

Embodiments of the disclosure may use video technology and analytics to receive features like audience face detection and head pose (e.g., yaw and pitch angles) to provide an engagement score along with the audience's mood score (e.g., by using a happiness index). In addition, embodiments of the disclosure may be agnostic to the presenter's movements by using collective intelligence and unsupervised clustering to derive outliers (i.e., disengaged audience members) within each cluster.

Individual head poses in the audience may vary, for example, individuals on the presenter's left side may have a viewing angle that may be opposite to individuals on the presenter's right side. Accordingly, it may be difficult to determine if an individual is viewing directly towards the presenter or towards the presenter's presentation, for example, on a screen. To address this issue, embodiments of the disclosure may use clustering on the received head pose data. The number of clusters, for example, may be based on the audience size.

Figure 1:
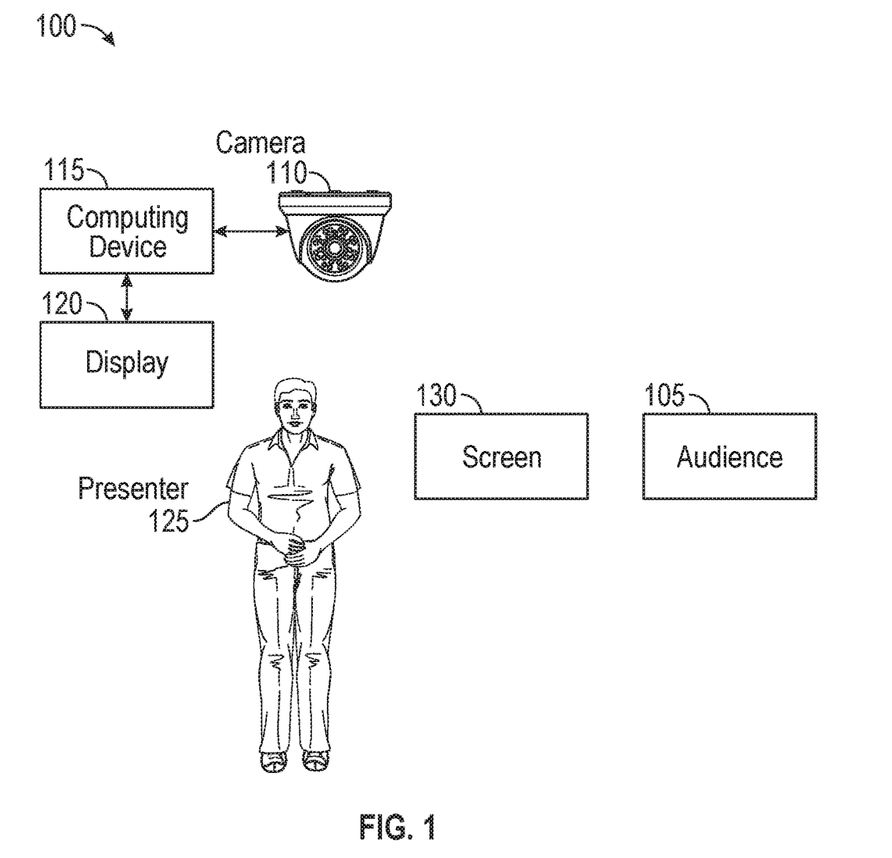
FIG. 1 is a block diagram of a system for determining audience engagement.
Figure 2:
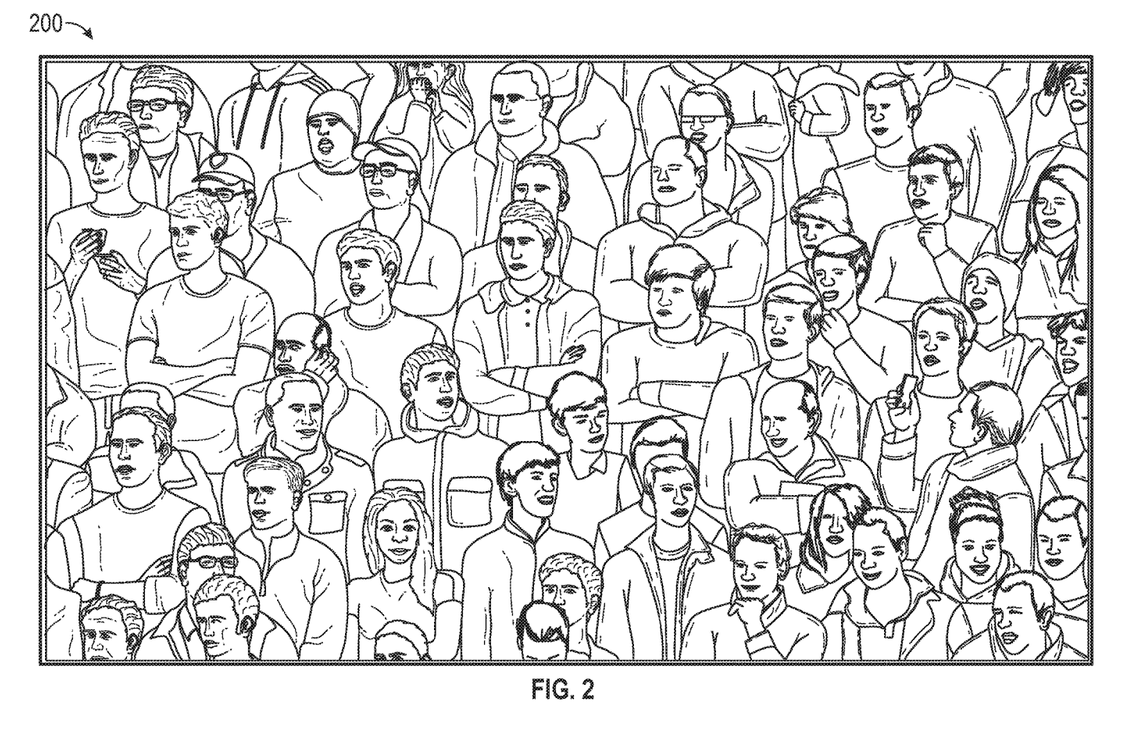
FIG. 2 shows an image.

FIG. 1 is a block diagram of a system 100 for determining engagement of an audience 105. As shown in FIG. 1, system 100 may comprise a camera 110, a computing device 115, and a display 120. Camera 110 may comprise a digital camera that may feed images in real-time to computing device 115 through a network, for example. A presenter 125 may be presenting a presentation to audience 105. While presenting the presentation to audience 105, presenter 125 may move about while speaking to audience 105 and referencing information on a screen 130 to audience 105. Camera 110 may capture, for example, an image 200 of audience 105 as shown in FIG. 2.

Once captured by computing device 115, images (e.g., image 200) may be saved, viewed, or processed by computing device 115. Display 120 may connect to computing device 115 for presentation of images, text, or other information from computing device 115. The functionality of computing device 115 may be provided locally or through a cloud based service. Computing device 115 may comprise, but is not limited to, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 115 may be described in greater detail below with respect to FIG. 8.

Figure 3:
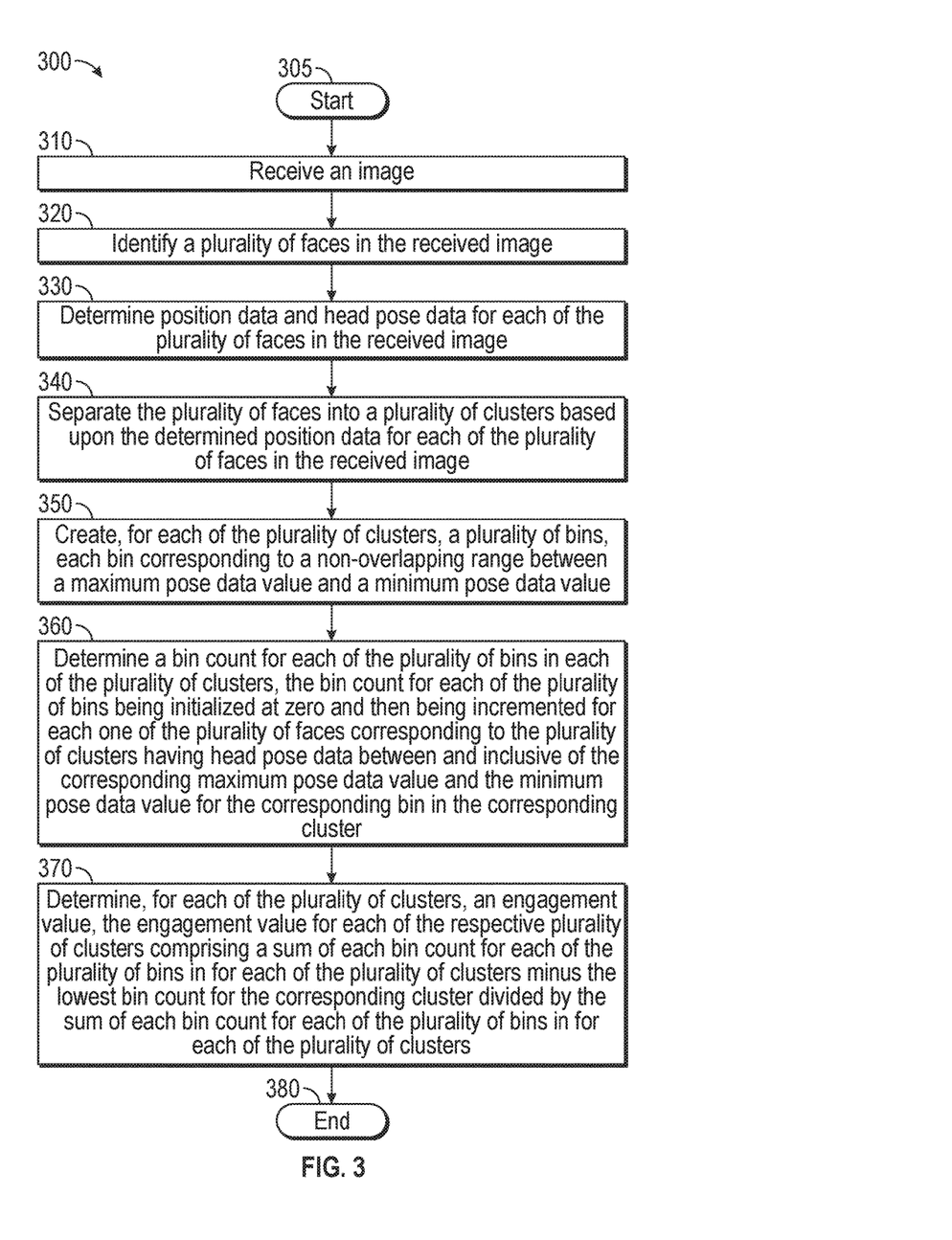
FIG. 3 is a flow chart of a method for determining audience engagement.

FIG. 3 is a flow chart setting forth the general stages involved in a method 300 consistent with an embodiment of the disclosure for determining audience engagement. Method 300 may be implemented using computing device 115 as described above with respect to FIG. 1 and in more detail below with respect to FIG. 8. Ways to implement the stages of method 300 will be described in greater detail below.

Method 300 may begin at starting block 305 and proceed to stage 310 where computing device 115 may receive image 200. For example, presenter 125 may present the presentation to audience 105. While presenting the presentation to audience 105, presenter 125 may move about a room or stage, for example, while speaking to audience 105 and referencing information on screen 130 to audience 105. During presenter 125's presentation to audience 105, camera 110 may capture, for example, image 200 of audience 105 as shown in FIG. 2. After capturing image 200, camera 110 may forward image 200 to computing device 115.

From stage 310, where computing device 115 receives image 200, method 300 may advance to stage 320 where computing device 115 may identify a plurality of faces in received image 200. For example, embodiments of the disclosure may capture audience feedback at events in real time for example. Facial features may be captured in image 200 taken by camera 110 facing audience 105. Computing device 115 may analyze image 200 and identify a plurality of faces in received image 200.

Figure 4:
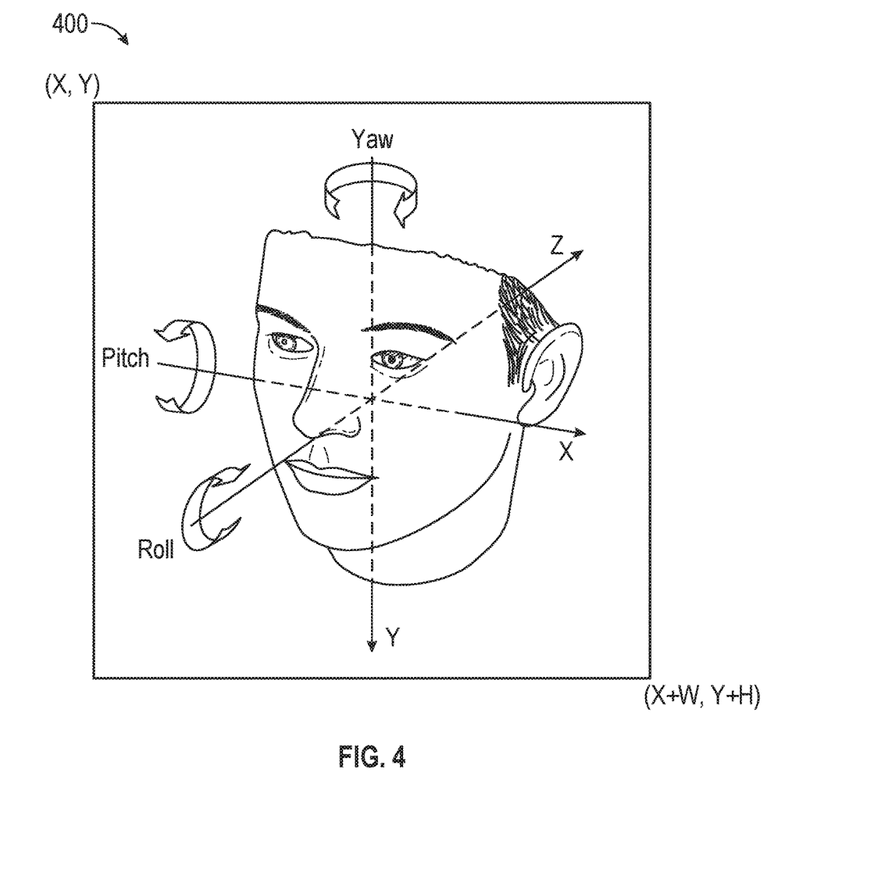
FIG. 4 is a block diagram showing a facial pose.

Once computing device 115 identifies the plurality of faces in received image 200 in stage 320, method 300 may continue to stage 330 where computing device 115 may determine position data and head pose data for at least some of the plurality of faces in received image 200. For example, FIG. 4 shows an example identified face 400 of the plurality of faces from image 200. As shown in FIG. 4, position data may comprise, but is not limited to, coordinates within image 200 of the upper left corner (e.g., (X, Y)) of identified face 400 and coordinates within image 200 of the lower right corner (X+W, Y+H) of identified face 400. Head pose data may comprise, but is not limited to, head yaw and head pitch values of identified face 400. Head yaw and head pitch values may be defined in units of degree shift from a point of origin of the view, in this case, a lens of camera 110 for example. The position data may provide the position of a person within image 200, while the head pose data like yaw and pitch may be used to estimate the engagement score of audience 105.

Figure 5:
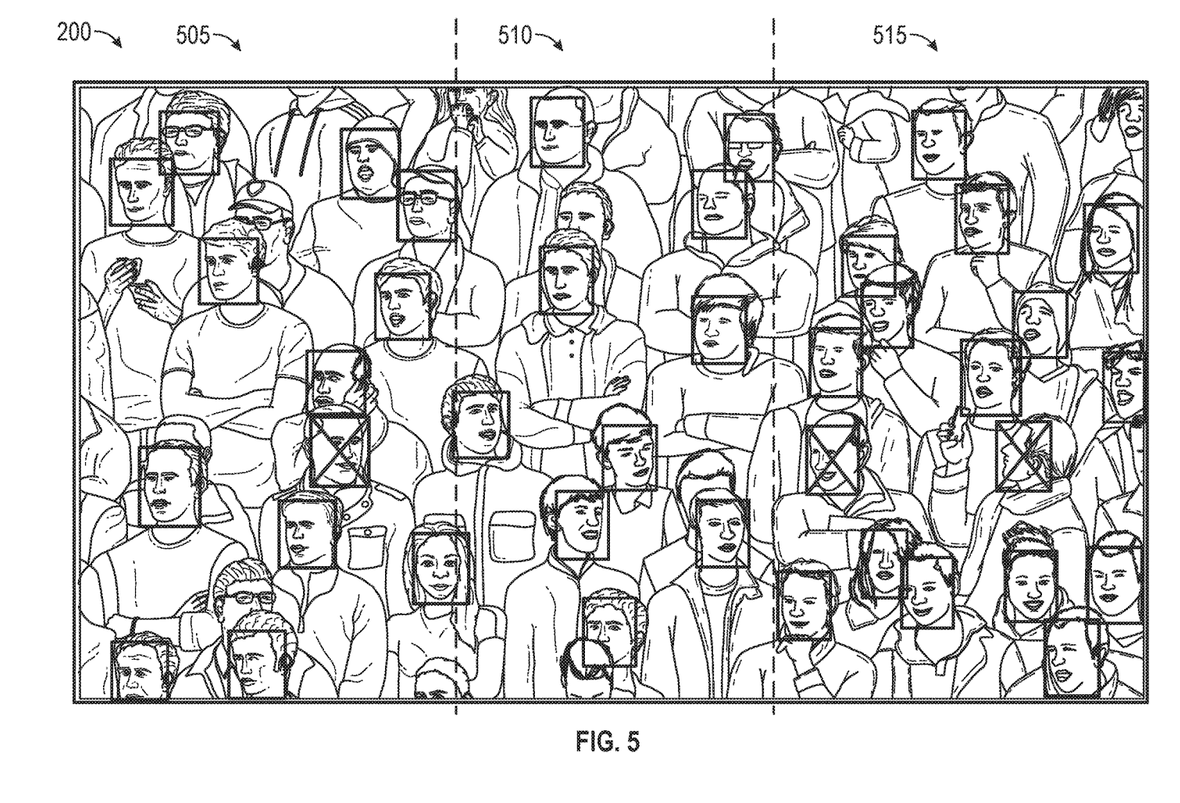
FIG. 5 shows an image divided into clusters.

After computing device 115 determines position data and head pose data for at least some of the plurality of faces in received image 200 in stage 330, method 300 may proceed to stage 340 where computing device 115 may separate some or all of the plurality of faces into a plurality of clusters based upon the determined position data for each of the plurality of faces in received image 200. As shown in FIG. 5, the plurality of clusters may comprise a first cluster 505, a second cluster 510, and a third cluster 515. While FIG. 5 shows three clusters, embodiments of the disclosure are not limited to three clusters. Embodiments of the disclosure, for example, may perform a k-means clustering based on the determined position data and head pose data collected. Choosing a cluster size of minimum of 6-10 faces in each cluster may give good results and may ensure a better accuracy in the engagement score. Embodiments of the disclosure may not put any upper limit on cluster size as more faces detected may provide a better result.

From stage 340, where computing device 115 separates some or all of the plurality of faces into the plurality of clusters, method 300 may advance to stage 350 where computing device 115 may create, for each of the plurality of clusters, a plurality of bins. The plurality of bins may correspond to a non-overlapping range between a maximum pose data value and a minimum pose data value.

Regarding the yaw values in the head pose data, for each cluster, the absolute value of the lowest yaw value may be added to the absolute value of the highest yaw value. This number may then be divided by the number of bins in the cluster to determine the span of each bin in the cluster. For example, the lowest yaw value for the plurality of faces in first cluster 505 may be −39.516407 and the highest yaw value for the plurality of faces in first cluster 505 may be 24.784523. If three bins are used for each cluster, for example, then the span for first cluster 505's bins may be:

$$(|-39.516407|+|24.784523|)/3=21.4336433$$

Regarding the pitch values in the head pose data, a minimum pitch value and a maximum pitch value may be used for the bins in the clusters. Table 1 illustrates minimum and maximum yaw values for each bin in first cluster 505, second cluster 510, and third cluster 515 and minimum and maximum pitch values for each bin in first cluster 505, second cluster 510, and third cluster 515.

TABLE 1

|  |  | Min Yaw | Max Yaw | Min Pitch | Max Pitch | Bin Cnt | Engagement Value |
|---|---|---|---|---|---|---|---|
| First Cluster 505 |  |  |  |  |  |  | 92.3077% |
|  | 1st Bin | −39.516407 | −18.08276367 | −10 | 30 | 10 |  |
|  | 2nd Bin | −18.08276367 | 3.35087967 | −10 | 30 | 2 |  |

TABLE 1-continued

|  |  | Min Yaw | Max Yaw | Min Pitch | Max Pitch | Bin Cnt | Engagement Value |
|---|---|---|---|---|---|---|---|
|  | 3rd Bin | 3.35087967 | 24.78452300 | −10 | 30 | 1 |  |
| Second Cluster 510 |  |  |  |  |  |  | 100.0000% |
|  | 1st Bin | −32.32363500 | −9.90627533 | −10 | 30 | 6 |  |
|  | 2nd Bin | −9.90627533 | 12.51108433 | −10 | 30 | 0 |  |
|  | 3rd Bin | 12.51108433 | 34.92844400 | −10 | 30 | 4 |  |
| Third Cluster 515 |  |  |  |  |  |  | 88.2353% |
|  | 1st Bin | −68.60983300 | −43.56241813 | −10 | 30 | 2 |  |
|  | 2nd Bin | −43.56241813 | −18.51500327 | −10 | 30 | 10 |  |
|  | 3rd Bin | −18.51500327 | 6.53241160 | −10 | 30 | 5 |  |

Once computing device 115 creates the plurality of bins in stage 350, method 300 may continue to stage 360 where computing device 115 may determine a bin count for each of the plurality of bins in each of the plurality of clusters. The bin count for each of the plurality of bins may be initialized (e.g., at zero) and then incremented for faces in a corresponding cluster of the plurality of clusters having head pose data between the maximum pose data value and the minimum pose data value for the corresponding bin in the corresponding cluster.

Continuing the above example, first cluster 505 may have a total of 13 faces in its corresponding plurality of faces. 10 of the 13 identified faces may have head pose data placing them in first cluster 505's first bin, 2 of the 13 identified faces may have head pose data placing them in first cluster 505's second bin, and 1 of the 13 identified faces may have head pose data placing it in first cluster 505's third bin as illustrated in Table 1.

Similarly, second cluster 510 may have a total of 10 faces in its corresponding plurality of faces. 6 of the 10 identified faces may have head pose data placing them in second cluster 510's first bin, 0 of the 10 identified faces may have head pose data placing them in second cluster 510's second bin, and 4 of the 10 identified faces may have head pose data placing them in second cluster 510's third bin as illustrated in Table 1.

And third cluster 515 may have a total of 17 faces in its corresponding plurality of faces. 2 of the 17 identified faces may have head pose data placing them in third cluster 515's first bin, 10 of the 17 identified faces may have head pose data placing them in third cluster 515's second bin, and 5 of the 17 identified faces may have head pose data placing them in third cluster 515's third bin as illustrated in Table 1.

After computing device 115 determines the bin counts for the plurality of bins in each of the plurality of clusters in stage 360, method 300 may proceed to stage 370 where computing device 115 may determine, for each of the plurality of clusters, an engagement value. The engagement value for each of the respective plurality of clusters may comprise a total bin count for the plurality of bins in for each of the plurality of clusters minus the lowest bin count for the corresponding cluster, divided by the total bin counts for the plurality of bins in for each of the plurality of clusters.

Continuing the above example, as illustrated in Table 1, first cluster 505's lowest bin may be its third bin having a count of 1. This bin may correspond to the face having an "X" over it as shown in first cluster 505 of FIG. 5. This face may be considered an outlier and thus considered disengaged. Discarding the lowest bin count, adding the counts from the remaining bins, and then dividing by the total number of faces detected in first cluster 505, an engagement value for first cluster 505 may comprise 12 divided by 13 or 92.3077% as illustrated by Table 1.

In addition, as illustrated in Table 1, second cluster 510's lowest bin may be its second bin having a count of 0. Second cluster 510 may also have two different sets of faces (top half of second cluster 510 versus the bottom half of second cluster 510) looking in different directions with both sets of faces being identified as engaged. This may be due to embodiments of the disclosure using sub-clustering (i.e., modal bins). In this case, there may be sets of localized people looking nearly equally in different directions. For example, one set may be looking at screen 130 while the other set may be looking at presenter 125. Thus both sets may be considered engaged. Discarding the lowest bin count, adding the counts from the remaining bins, and then dividing by the total number of faces detected in second cluster 510, an engagement value for second cluster 510 may comprise 10 divided by 10 or 100% as illustrated by Table 1.

Furthermore, as illustrated in Table 1, third cluster 515's lowest bin may be its first bin having a count of 2. This bin may correspond to the faces having an "X" over then as shown in third cluster 515 of FIG. 5. These faces may be considered outliers and thus considered disengaged. Discarding the lowest bin count, adding the counts from the remaining bins, and then dividing by the total number of faces detected in third cluster 515, an engagement value for third cluster 515 may comprise 15 divided by 17 or 88.2353% as illustrated by Table 1.

Figure 6:
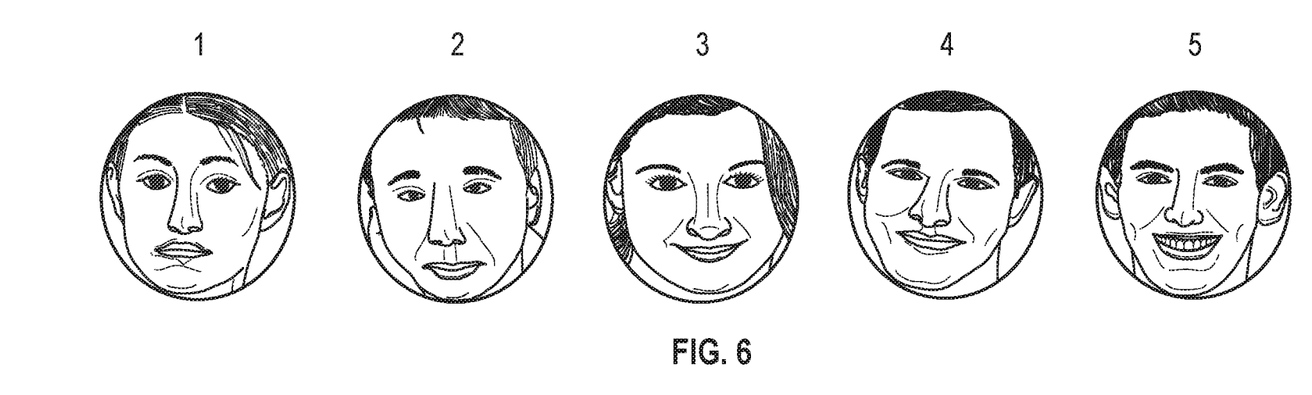
FIG. 6 illustrates an emotional index.

In addition to the engagement value for each of the plurality of clusters, embodiments of the disclosure may determine an emotional index (e.g., happiness index) for each of the plurality of clusters. For example, for at least some of the plurality of faces in the plurality of clusters, computing device 115 may determine an individual emotional value for the at least some of the plurality of faces in the plurality of clusters. Then, for each cluster, computing device 115 may average some or all of the individual emotional values for the at least some of the plurality of faces in the corresponding plurality of clusters. This average individual emotional value in a given clusters may comprise that cluster's emotional index. Faces in the plurality of faces in the plurality of clusters may be given an individual emotional value for example, between 1 and 5 as shown in FIG. 6 based upon, for example, the level of smiling detected by computing device 115 in image 200. Then individual emotional values for faces in each cluster may be averaged to determine the emotional index corresponding to the plurality of clusters.

Figure 7A:
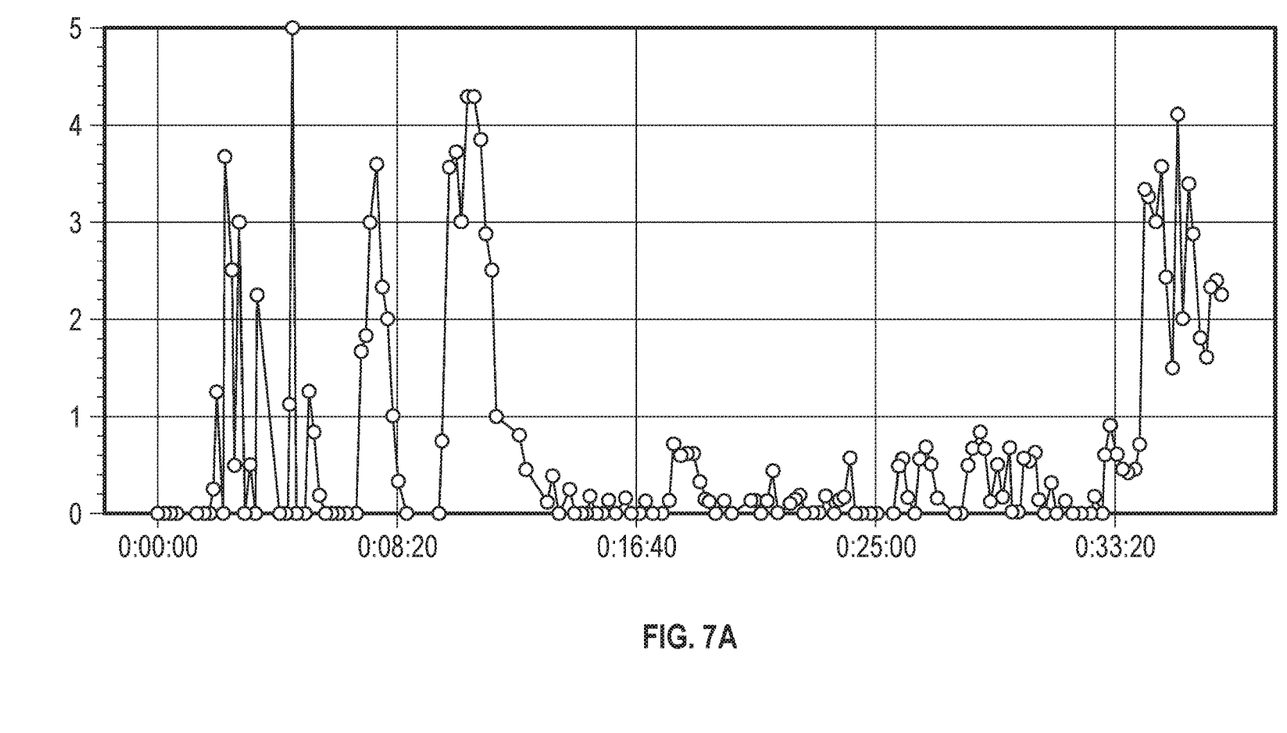
FIG. 7A illustrates a sample output display.
Figure 7B:
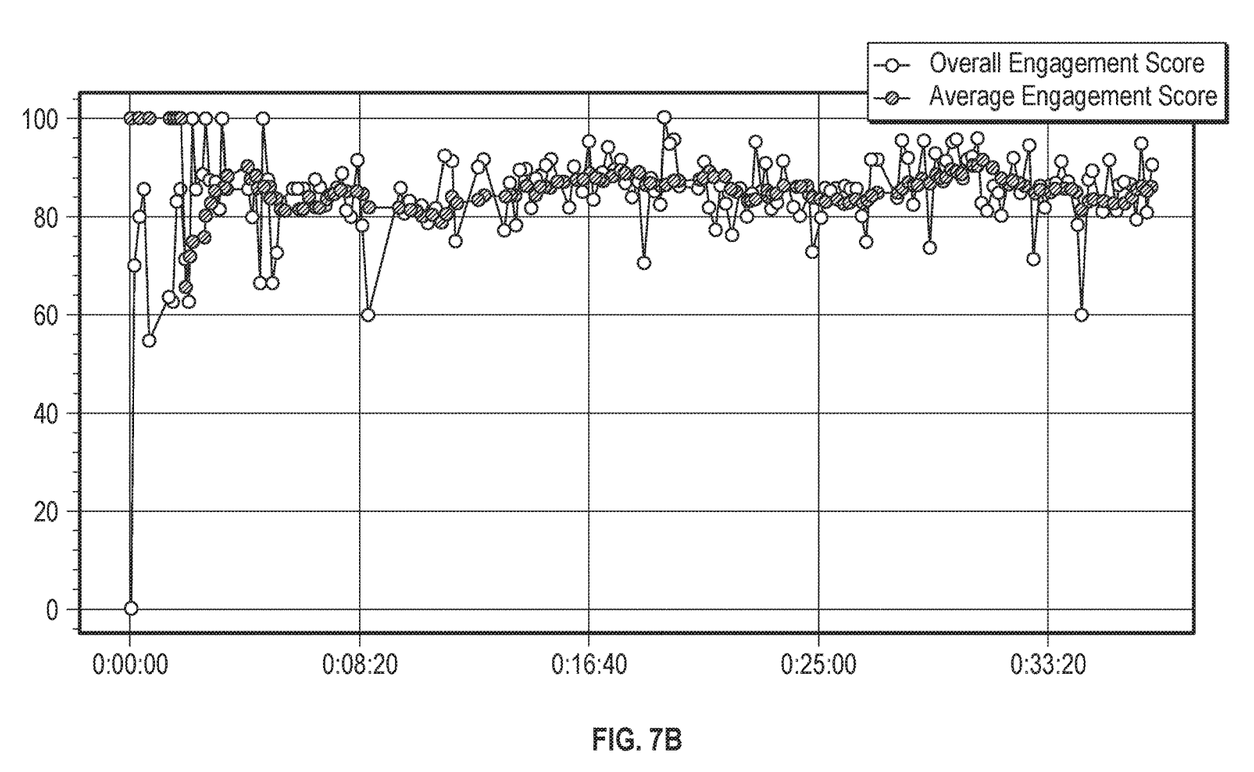
FIG. 7B illustrates a sample output display.

Moreover, embodiments of the disclosure may display the engagement value (i.e., engagement score) for each of the plurality of clusters and the emotional index (i.e., happiness index, mood score) for each of the plurality of clusters to presenter 125 presenting to a group of people (e.g., audience 105) corresponding to image 200. The engagement value for each of the plurality of clusters and the emotional index for each of the plurality of clusters may be re-calculated periodically by the above process and presented in numerical or graphical form, for example, as shown in FIG. 7A (e.g., emotional index) and FIG. 7B (e.g., engagement value). The engagement value and the emotional index may be presented as an overall value from audience 105 or may be broken down and presented on a cluster-by-cluster basis. In this way, presenter 125 may view the displayed engagement values and the displayed emotional indexes for each of the plurality of clusters and address the audience corresponding to the plurality of clusters in real-time in order to improve the engagement values and the emotional indexes. Embodiments of the disclosure may provide a real-time solution that may help presenter 125 to identify clusters in audience 105 where an engagement score (i.e., value) is low. Based on the engagement score, presenter 125 may take actions in real-time to improve upon the overall audience engagement. Once computing device 115 determines the engagement value for each of the plurality of clusters in stage 370, method 300 may then end at stage 380.

Figure 8:
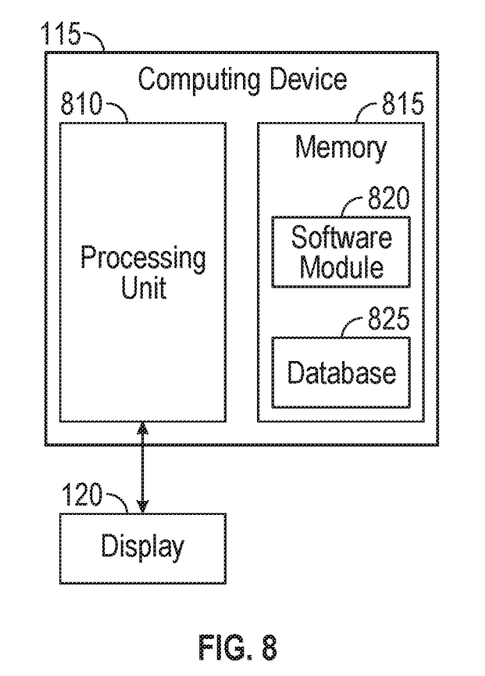
FIG. 8 is a block diagram of a computing device.

FIG. 8 shows computing device 115 in more detail. As shown in FIG. 8, computing device 115 may include a processing unit 810 and a memory unit 815. Memory unit 815 may include a software module 820 and a database 825. Computing device 115 may further connect to display 120 upon which it may display information. While executing on processing unit 810, software module 820 may perform processes for determining audience engagement, including for example, any one or more of the stages from method 300 described above with respect to FIG. 3.

Computing device 115 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 115 may comprise any computer operating environment, such as hand-held devices, multiprocessor systems, microprocessor-based or programmable sender electronic devices, minicomputers, mainframe computers, and the like. Computing device 115 may also be practiced in distributed computing environments where tasks are performed by remote processing devices. Furthermore, computing device 115 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand-held computer, a conventional telephone, or a Wireless Fidelity (Wi-Fi) access point. The aforementioned systems and devices are examples and computing device 115 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving an image;
   identifying a plurality of faces in the received image;
   determining position data and head pose data for at least some of the plurality of faces identified in the received image;
   separating the some of the plurality of faces into a plurality of clusters based upon the determined position data;
   creating, for each of the plurality of clusters, a plurality of bins, each of the plurality of bins corresponding to a non-overlapping range between a maximum pose data value and a minimum pose data value;
   determining bin counts for the plurality of bins in each of the plurality of clusters, each bin count being initialized and then being incremented for faces in a corresponding cluster of the plurality of clusters having head pose data between a maximum pose data value and a minimum pose data value for a corresponding bin in the corresponding cluster; and
   determining, for each of the plurality of clusters, an engagement value, the engagement value for each of the respective plurality of clusters comprising a total bin count for the plurality of bins in each of the plurality of clusters minus the lowest bin count for the corresponding cluster, divided by the total bin count for the plurality of bins in each of the plurality of clusters.

2. The method of claim 1, further comprising displaying the engagement value for each of the plurality of clusters.

3. The method of claim 1, further comprising displaying the engagement value for each of the plurality of clusters to a person presenting to a group of people corresponding to the image.

4. The method of claim 1, further comprising determining an emotional index for each of the plurality of clusters.

5. The method of claim 4, further comprising displaying the determined emotional index for each of the plurality of clusters.

6. The method of claim 5, further comprising displaying the determined emotional index for each of the plurality of clusters to a person presenting to a group of people corresponding to the image.

7. The method of claim 1, wherein determining the head pose data for the at least some of the plurality of faces in the received image comprises determining at least one of the following for the at least some of the plurality of faces in the received image: yaw data and pitch data.

8. An apparatus comprising:
   a memory storage; and
   a processing unit coupled to the memory storage, the processing unit being configured to:
      determine position data and head pose data for at least some of a plurality of faces in an image;
      separate the at least some of the plurality of faces into a plurality of clusters based upon the determined position data;
      create, for each of the plurality of clusters, a plurality of bins, each of the plurality of bins corresponding to a non-overlapping range between a maximum pose data value and a minimum pose data value;
      determine bin counts for the plurality of bins in each of the plurality of clusters, each bin count being initialized and then being incremented for faces in a corresponding cluster of the plurality of clusters having head pose data between a maximum pose data value and a minimum pose data value for a corresponding bin in the corresponding cluster;
      determine, for each of the plurality of clusters, an engagement value, the engagement value for each of the respective plurality of clusters comprising a total bin counts for the plurality of bins in each of the plurality of clusters minus the lowest bin count for the corresponding cluster, divided by the total bin counts for each of the plurality of bins in each of the plurality of clusters; and
      display the engagement value for each of the plurality of clusters.

9. The apparatus of claim 8, wherein the processing unit is further configured to receive the image.

10. The apparatus of claim 8, wherein the processing unit is further configured to identify the at least some of the plurality of faces in the image.

11. The apparatus of claim 8, wherein the processing unit is further configured to determine an emotional index for each of the plurality of clusters.

12. The apparatus of claim 11, wherein the processing unit is further configured to display the determined emotional index for each of the plurality of clusters.

13. The apparatus of claim 8, wherein the processing unit being configured to determine the head pose data for the at least some of the plurality of faces in the image comprises the processing unit being configured to determine at least one of the following for the at least some of the plurality of faces in the image: yaw data and pitch data.

14. A non-transitory computer-readable medium that stores a set of instructions which when executed perform a method executed by the set of instructions comprising:
   determining position data and head pose data for at least some of a plurality of faces in a received image;

separating the at least some of the plurality of faces into a plurality of clusters based upon the determined position data;

creating, for each of the plurality of clusters, a plurality of bins, each of the plurality of bins corresponding to a non-overlapping range between a maximum pose data value and a minimum pose data value;

determining a bin counts for the plurality of bins in each of the plurality of clusters, each bin count being initialized and then being incremented for faces in a corresponding cluster of the plurality of clusters having head pose data between a maximum pose data value and a minimum pose data value for a corresponding bin in the corresponding cluster; and determining, for each of the plurality of clusters, an engagement value, the engagement value for each of the respective plurality of clusters comprising total bin counts for the plurality of bins in each of the plurality of clusters minus the lowest bin count for the corresponding cluster, divided by the total bin count for the plurality of bins in each of the plurality of clusters.

15. The non-transitory computer-readable medium of claim 14, further comprising receiving the image.

16. The non-transitory computer-readable medium of claim 14, further comprising identifying the at least some of the plurality of faces in the image.

17. The non-transitory computer-readable medium of claim 14, further comprising displaying the engagement value for each of the plurality of clusters.

18. The non-transitory computer-readable medium of claim 14, further comprising determining an emotional index for each of the plurality of clusters.

19. The non-transitory computer-readable medium of claim 18, further comprising displaying the determined emotional index for each of the plurality of clusters.

20. The non-transitory computer-readable medium of claim 14, wherein determining the head pose data for the at least some of the plurality of faces in the received image comprises determining at least one of the following for the at least some of the plurality of faces in the received image: yaw data and pitch data.

\* \* \* \* \*